United States Patent
Ao

(10) Patent No.: US 9,225,600 B2
(45) Date of Patent: Dec. 29, 2015

(54) AUTOMATIC CONFIGURATION OF HOST NETWORKING DEVICE NETWORKING INTERFACE WITHOUT USER INTERACTION

(71) Applicant: LENOVO ENTERPRISE SOLUTIONS SINGAPORE PTE. LTD., New Tech Park (SG)

(72) Inventor: Eric R. Ao, Nepean (CA)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 343 days.

(21) Appl. No.: 13/745,831

(22) Filed: Jan. 20, 2013

(65) Prior Publication Data

US 2014/0207922 A1    Jul. 24, 2014

(51) Int. Cl.
*H04L 12/24* (2006.01)

(52) U.S. Cl.
CPC .................................. *H04L 41/0886* (2013.01)

(58) Field of Classification Search
None
See application file for complete search history.

(56) References Cited

U.S. PATENT DOCUMENTS

| | | | |
|---|---|---|---|
| 5,410,535 A | 4/1995 | Yang et al. | |
| 6,223,218 B1 | 4/2001 | Iijima et al. | |
| 6,859,825 B1 | 2/2005 | Williams | |
| 7,194,003 B2 | 3/2007 | Danner et al. | |
| 7,409,709 B2 | 8/2008 | Smith et al. | |
| 7,512,141 B2 | 3/2009 | Elie-Dit-Cosaque et al. | |
| 8,798,454 B2 * | 8/2014 | Akasaka | 398/2 |
| 8,989,284 B1 * | 3/2015 | Vijayaraghavan et al. | 375/259 |
| 2004/0091027 A1 * | 5/2004 | Booth | 375/219 |
| 2004/0105456 A1 | 6/2004 | Lanzone et al. | |
| 2004/0223462 A1 * | 11/2004 | Cromer et al. | 370/252 |
| 2005/0111531 A1 * | 5/2005 | Booth et al. | 375/219 |
| 2007/0271054 A1 * | 11/2007 | Chen et al. | 702/85 |
| 2010/0092174 A1 | 4/2010 | Brown et al. | |
| 2010/0229067 A1 * | 9/2010 | Ganga et al. | 714/752 |
| 2010/0296559 A1 * | 11/2010 | Barbieri et al. | 375/222 |
| 2011/0022923 A1 * | 1/2011 | Diab et al. | 714/752 |
| 2011/0074592 A1 | 3/2011 | Taich et al. | |
| 2011/0149772 A1 * | 6/2011 | Han | 370/252 |
| 2011/0200056 A1 | 8/2011 | Diab et al. | |
| 2011/0268120 A1 | 11/2011 | Vobbilisetty et al. | |
| 2011/0299396 A1 | 12/2011 | Yan et al. | |
| 2012/0044951 A1 * | 2/2012 | Han | 370/419 |
| 2012/0155486 A1 * | 6/2012 | Ahn et al. | 370/433 |
| 2012/0243553 A1 * | 9/2012 | Rabinovich | 370/463 |
| 2012/0288277 A1 * | 11/2012 | Shin et al. | 398/45 |
| 2013/0077623 A1 * | 3/2013 | Han | 370/389 |

(Continued)

*Primary Examiner* — Greg C Bengzon
(74) *Attorney, Agent, or Firm* — Katherine Brown

(57) ABSTRACT

A host networking device networking interface is automatically configured. The interface is initially configured to operate in a single-link mode in which multiple network communication lanes of the interface cooperatively provide a single communication link. If a signal is not present on any communication lane, then the interface is configured to operate in a multiple-link mode in which each lane provides a separate and different communication link, and is operated in the multiple-link mode. If a signal is present on every communication lane, and if the single communication link has been established with another networking device over all the lanes, then the interface is operated in the single-link mode. If a signal is present on every communication lane, but if the single communication link has not been established over all the lanes, then the interface is configured to operate in the multiple-link mode and is operated in the multiple-link mode.

19 Claims, 3 Drawing Sheets

(56) References Cited

U.S. PATENT DOCUMENTS

| | | | |
|---|---|---|---|
| 2013/0083810 A1* | 4/2013 | Ghiasi et al. | 370/535 |
| 2013/0117639 A1* | 5/2013 | Ganga et al. | 714/776 |
| 2013/0156077 A1* | 6/2013 | Au et al. | 375/220 |
| 2014/0254640 A1* | 9/2014 | Lusted et al. | 375/219 |

* cited by examiner

AUTOMATIC CONFIGURATION OF HOST NETWORKING DEVICE NETWORKING INTERFACE WITHOUT USER INTERACTION

BACKGROUND

Ethernet has evolved to meet the growing demands of packet-switched networks. It has become the unifying technology enabling communications via the Internet and other networks using the Internet Protocol (IP). Due to its proven low cost, known reliability, and simplicity, the majority of today's Internet traffic starts or ends on an Ethernet connection. This popularity has resulted in a complex ecosystem among carrier networks, enterprise networks, and consumers, creating a symbiotic relationship among its various parts.

Communication across a single network communication lane of an Ethernet networking interface is typically limited at ten gigabits-per-second (Gb/s) in accordance with the IEEE 802.3 Ethernet standard. As bandwidth needs have increased, an amendment to the IEEE 802.3 standard, known as the IEEE 802.3ba amendment, has been ratified which increased bandwidth to forty and one-hundred Gb/s. In the former, four network communication lanes at ten Gb/s each are employed to provide a total of forty Gb/s, whereas in the latter, ten network communication lanes also at ten Gb/s each are used to provide a total of one-hundred Gb/s.

SUMMARY

An example method of the disclosure is for automatically configuring a networking interface of a host networking device. The method includes configuring the networking interface, by the host networking device without user interaction, to operate in a single-link mode in which multiple network communication lanes of the networking interface cooperatively provide a single communication link. The method includes after configuring the networking interface to operate in the single-link mode, determining, by the host networking device without user interaction, whether a signal is present on each network communication lane. The method includes in response to determining that the signal is not present on any network communication lane, configuring the networking interface, by the host networking device without user interaction, to operate in a multiple-link mode in which each network communication lane provides a separate and different communication link, and operating the networking interface in the multiple-link mode.

The method includes in response to determining that the signal is present on every network communication lane, determining, by the host networking device without user interaction, whether the single communication link has been established with another networking device over all the network communication lanes. The method includes in response to determining that the signal is present on every network communication lane, and in response to determining that the single communication link has been established over all the network communication lanes, operating the networking interface in the single-link mode. The method includes in response to determining that the signal is present on every communication lane, and in response to determining that the single communication link has not been established over all the network communication lanes, configuring the networking interface, by the host networking device without user interaction, to operate in the multiple-link mode, and operating the networking interface in the multiple-link mode.

An example host networking device of the disclosure includes a network interface having multiple network communication lanes. The host network computing device includes logic implement at least by hardware. The logic is to automatically configure the network interface without user interaction between operation in a single-link mode in which the network communication lanes cooperatively provide a single communication link and a multiple-link mode in which each network communication lane provides a separate and different communication link.

An example computer program product includes a computer-readable storage medium having computer-readable code embodied therein, and executable by a host computing device having a networking interface. The computer-readable code includes first computer-readable code to configure the networking interface without user interaction to operate in a single-link mode in which multiple network communication lanes of the networking interface cooperatively provide a single communication link. The computer-readable code includes second computer-readable code to, after configuring the networking interface to operate in the single-link mode, determine without user interaction whether a signal is present on each network communication lane. The computer-readable code includes third computer-readable code to, in response to determining that the signal is not present on any network communication lane, configure the networking interface without user interaction to operate in a multiple-link mode in which each network communication lane provides a separate and different communication link, and to operate the networking interface in the multiple-link mode.

The computer-readable code includes fourth computer-readable code to, in response to determining that the signal is present on every network communication lane, determine without user interaction whether the single communication link has been established with another networking device over all the network communication lanes. The computer-readable code includes fifth computer-readable code to, in response to determining that the single communication link has been established over all the network communication lanes, operate the networking interface in the single-link mode. The computer-readable code includes sixth computer-readable code to, in response to determining that the single communication link has not been established over all the network communication lanes, configure the networking interface without user interaction, to operate in the multiple-link mode, and to operate the networking interface in the multiple-link mode.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
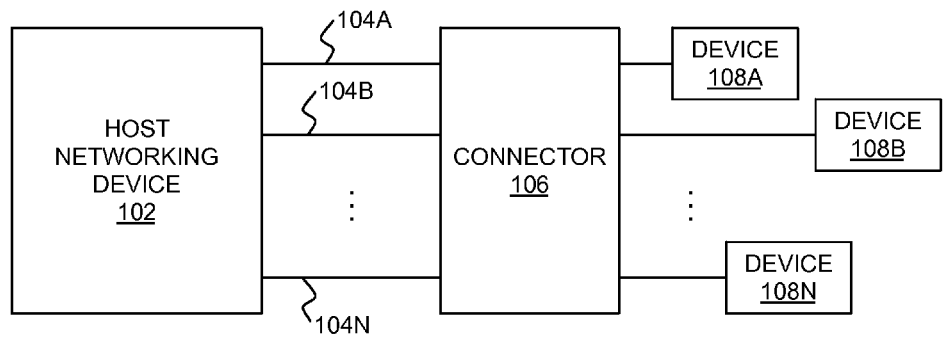
FIG. 1 is a diagram of an example host networking device operating in a multiple-link mode.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, the IEEE 802.3ba amendment permits multiple network communication lanes to be harnessed to provide bandwidth greater than the ten gigabits-per-second (Gb/s) bandwidth that can be provided by any single network communication lane. Therefore, in a single-link mode, multiple communication lanes of an Ethernet networking interface cooperatively provide a single communication link that can have forty Gb/s or one-hundred Gb/s bandwidth, for instance. In a multiple-link mode, each communication lane provides its own separate and different communication link at a lower bandwidth, such as ten Gb/s.

However, the Ethernet networking interface has to be manually configured to operate in either the single-link mode or the multiple-link mode. For instance, if a host networking device having such a networking interface is connected to a device that supports the single-link mode, the host networking device itself also has to be configured to operate in the single-link mode to take advantage of the greater bandwidth provided by the IEEE 802.3ba amendment. As another example, if multiple communication lanes of a host networking device are connected to multiple devices, but the host networking device is configured to operate in the single-link mode, then the host networking device may not be able to properly communicate with these multiple devices until it has been reconfigured to operate in the multiple-link mode.

Techniques disclosed herein provide for automatic configuration of a networking interface of a host networking device without user interaction. The networking interface is initially configured to operate in a single-link mode. Whether a signal is present on each network communication lane is determined. If a signal is not present on any network communication lane, then the networking interface is (re)configured to operate in a multiple-link mode and is operated in this mode. However, if a signal is present on every network communication lane, and if a single communication link has been established with another networking device over all the network communication lanes, the networking interface is operated in the single-link mode in which it was previously configured. If a signal is present on every network communication lane, but if a single communication link has not been established over all the lanes, the networking interface is (re)configured to operate in the multiple-link mode and is operated in this mode.

The automatic configuration process may occur responsive to reboot of the host networking device, user initiation of networking interface reconfiguration, determination that a networking cable has been disconnected from the networking interface, and so on. For example, if the multiple network communication lanes are connected to multiple devices, then even though the networking interface is initially configured to operate in the single-link mode, the interface will be automatically reconfigured to operate in the multiple-link mode. This is because a signal is not present on every network communication lane, or because a signal is present on every network communication lane but a single communication link has not been established over all the lanes.

FIG. 1 shows an example host networking device 102 operating in a multiple-link mode, such as that provided by or consistent with the IEEE 802.3ba amendment. The host networking device 102 may be a server computing device, a router, a switch, or another type of host networking device. The host networking device 102 includes multiple network communication lanes 104A, 104B, . . . , 104N, which are collectively referred to as the network communication lanes 104. There are N network communication lanes 104, where N can be equal to four or ten in accordance with the 802.3ab amendment, but where more generally N is greater than one.

A network communication lane is generally a physical interconnect between two networking devices that provides a data communication path in each direction. For instance, each network communication lane 104 may be a cable of unshielded or shielded twisted-pair conductors culminating in bare wires or a network jack like an RJ45 jack. Each network communication lane 104 may be in accordance with the 10GBASE-T, or IEEE 802.3an-2006, standard that provides for a maximum of ten Gb/s thereover.

The network communication lanes 104 are connected to a connector 106. The connector 106 may be a quad small form-factor pluggable (QSFP or QSFP+) connector, which is a compact, hot-pluggable transceiver used for data communication applications. In the multiple-link mode of FIG. 1, multiple networking devices 108A, 108B, . . . , 108N, collectively referred to as the devices 108, can be connected to the connector 106, such as via CAT5, CAT5e, or CAT6 cables, as one example.

In the multiple-link mode of FIG. 1, each network communication lane 104 provides a separate and different communication link. A communication, or data, link is generally a point-to-point communication session that is conducted using a protocol, such as the Internet Protocol (IP), and is independent of other communication links. Thus, the N network communication lanes 104 can provide N separate and different communication links. The host networking device 102 therefore is able to communicate with each device 108 over a separate and different communication link provided by a different network communication lane 104.

The maximum bandwidth of each communication link in the multiple-link mode of FIG. 1 is the maximum bandwidth of each communication lane 104. For example, if each communication lane 104 has a bandwidth of ten Gb/s, then each communication link itself can have up to ten Gb/s. Generally then, in the multiple-link mode, there are N communication links of X bandwidth each, where there are N communication lanes 104 each having a bandwidth X.

Figure 2:
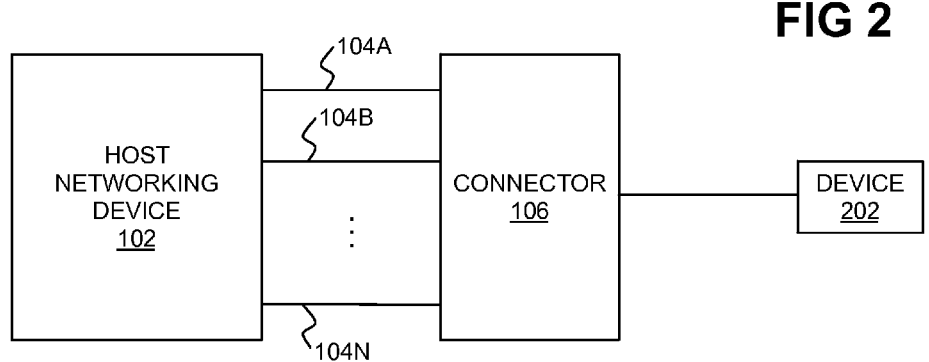
FIG. 2 is a diagram an example host networking device operating in a single-link mode.

FIG. 2 shows the example host networking device 102 operating in a single-link mode, such as that provided by or consistent with the IEEE 802.3ba amendment. The host networking device 102 again includes N network communication lanes 104 connected to the connector 106. In the single-link mode of FIG. 2, however, one networking device 202 can be connected to the connector 106, such as via an optical interconnect, as one example. The network communication lanes 104 further cooperatively provide a single communication link.

The maximum bandwidth of the single communication link in the single-link mode of FIG. 2 is equal to the number of network communication lanes 104 multiplied by the bandwidth of each communication lane 104. For example, if each network communication lane 104 has a bandwidth of ten Gb/s, then the single communication link itself can have up to forty Gb/s where there are four communication lanes 104, and up to one-hundred Gb/s where there are ten lanes 104. Generally then, in the single-link mode, there is one single communication link of (N times X) bandwidth, where there are N communication lanes 104 each having a bandwidth X.

Figure 3:
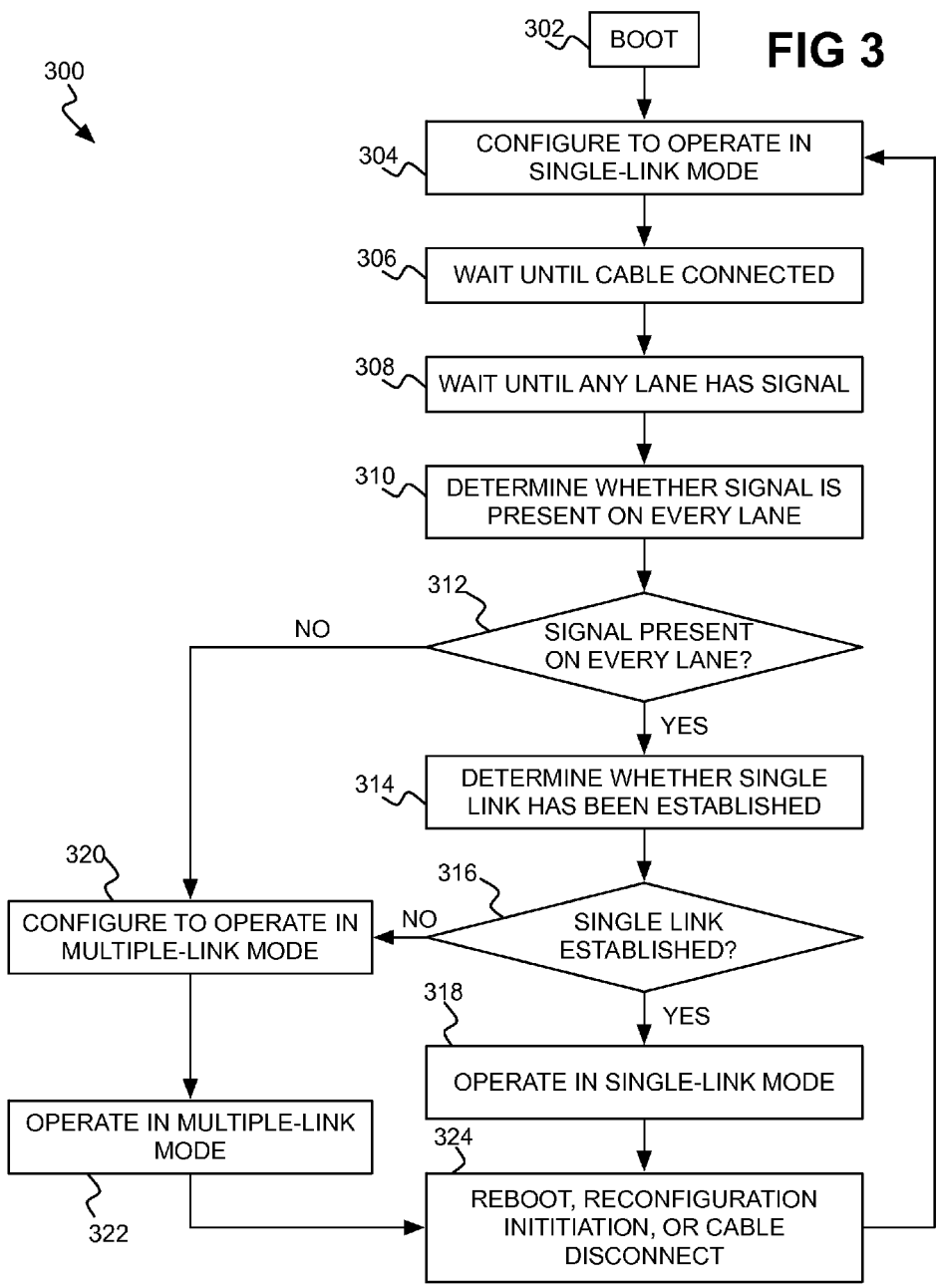
FIG. 3 is a flowchart of an example method for automatically configuring a host networking device to operate in a multiple-link mode or a single-link mode without user interaction.

FIG. 3 shows an example method 300 for automatically configuring a host networking device to switch between single-link mode and multiple-link mode. Once the host computing device has booted (302), a networking interface of the device is initially configured to operate in the single-link mode (304). The networking interface is not actually operated in this mode yet, however, but rather is configured so that it will operate in the single-link mode.

Thereafter, the method 300 waits until a networking cable has been connected to the networking interface (306). The networking cable can be a wire cable, such as a copper CAT5, CAT5e, or CAT6 cable, or an optical interconnect. The networking cable may be the cable that connects one of the devices 108 in FIG. 1 or the device 202 in FIG. 2 to the connector 106, presuming that the network communication lanes 104 have already been connected between the host networking device 102 and the connector 106.

Thereafter, the method 300 waits until any network communication lane has a signal present thereon (308). The method 300 then determines whether a signal is present on every network communication lane (310). Determining whether a signal is present on a network communication lane can be achieved by inspecting a physical medium dependent sublayer (PMD) loss-of-signal (LOS) signal provided by a physical devices sublayer (PHY) of the networking interface for the communication lane in question. For example, where the LOS signal is zero, this means that there is no loss of signal, such that a signal is present on the corresponding network communication lane. By comparison, where the LOS signal is one this means that there is a loss of signal, such that a signal is not present on the corresponding network communication lane.

If a signal is present on every network communication lane, then one of two scenarios may have occurred. First, per FIG. 1, a device 108 may have been connected to every network communication lane 104, such that multiple devices 108 have been connected to all the network communication lanes 104 over multiple communication links. Second, per FIG. 2, a single device 202 may have been connected to every network communication lane 104, such that the one device 202 has been connected to all the network communication lanes 104 over a single communication link.

In either such scenario, a signal is present on every network communication lane (312), and therefore the method 300 determines with a single communication link has been established (314), which signifies that the scenario of FIG. 2 has occurred, as opposed to that of FIG. 1. Determining whether a single communication link has been established can be achieved by inspecting a physical coding sublayer (PCS) link-up signal provided by the PHY of the networking interface for the single communication link. For example, if the PCS link-up signal is one, this means that the single communication link has been established (corresponding to FIG. 2), whereas if the PCS link-up signal is zero, this means that the single communication link has not been established (corresponding to FIG. 1). If a single communication link has been established (316), then the method 300 proceeds to operate the networking interface of the host networking device in the single-link mode in which the interface has previously been configured in part 304 (318), and such as that of FIG. 2.

Referring back to part 310, if a signal is not present on every network communication lane, then just one scenario can have occurred. Specifically, per FIG. 1, one or more devices 108 have been connected to corresponding one or more network communication lanes 104, but not to all the network communication lanes 104. The scenario of FIG. 2 is not possible, because in FIG. 2, all the network communication lanes 104 have signals present thereon. Therefore, in this situation (312), the method 300 proceeds to configure the networking interface of the host networking device in the multiple-link mode (320), and operates the networking interface in this mode (322).

Referring back to part 314, if a signal is present on every network communication lane, but a single communication link has not been established, then similarly just one scenario can have occurred. Specifically, per FIG. 1, the devices 108 have been connected to all the network communication lanes 104. The scenario of FIG. 2 is not possible, because in FIG. 2, a single communication link has been established. Therefore, in this situation (316), the method 300 also proceeds to configure the networking interface of the host networking device in the multiple-link mode (320), and operates the networking interface in this mode (322).

Parts 304, 306, 308, 310, 312, 314, 316, 318, 320, and 322 of the method 300 are performed without user interaction. A user, such as a network administrator, does not initiate configuration of the networking interface to operate in the single-link mode in part 304, for instance, and does not initiate configuration of the networking interface to operate in the multiple-link mode in part 320. Rather, the host networking device itself can perform these parts of the method 300, without user assistance or interaction, to automatically configure the networking interface to operate in the proper mode depending on whether the scenario of FIG. 1 or the scenario of FIG. 2 has been detected.

The method 300, beginning at part 304, can be performed again where, for instance, the networking device has been rebooted, reconfiguration of the device has been initiated, or a networking cable has been detected as having been disconnected from the device (324). As to device reconfiguration initiation, a user may initiate such reconfiguration. It is noted in this situation, though, that the user does not actually assist in the reconfiguration process, but rather is simply issuing a command that causes the networking device to automatically reconfigure itself again. That a networking cable has been disconnected may be one of the networking cables interconnecting the devices 108 to the connector 106 in FIG. 1, the cable interconnecting the device 202 to the connector 106 in FIG. 2, or one of the network communication lanes 104 interconnecting the host network device 202 to the connector 106.

The automatic configuration that has been described with reference to FIGS. 1, 2, and 3 covers other scenarios in addition to those described above. As an example, in one implementation, there may be twelve network communication lanes 104. In the single-link mode that has been described, one or more single communication links, each of which encompass more than one network communication lane 104, may be established. For instance, up to three single communication links, each with a corresponding different networking device 202, may be established. Each single communication link may encompass four of the network communication lanes 104. If three single communication links are established, then no network communication lanes 104 remain unused; if two single communication links are established, then four communication lanes 104 remain unused; and if just one single link is established, then eight lanes 104 remain unused.

As another example, there may again be twelve network communication lanes 104. In the single-link mode that has been described, just one single communication link may be established, but in which just ten of the twelve network communication lanes 104 are used. The remaining two network communication lanes 104 thus remain unused in this example.

A single-link mode therefore means herein that more than one network communication lane 104 is used within the communication link in question. As described above, however, there may be more than one such single communication link in the single-link mode. By comparison, a multiple-link mode means herein that each communication link uses just one network communication lane 104 within each communication link.

Figure 4:
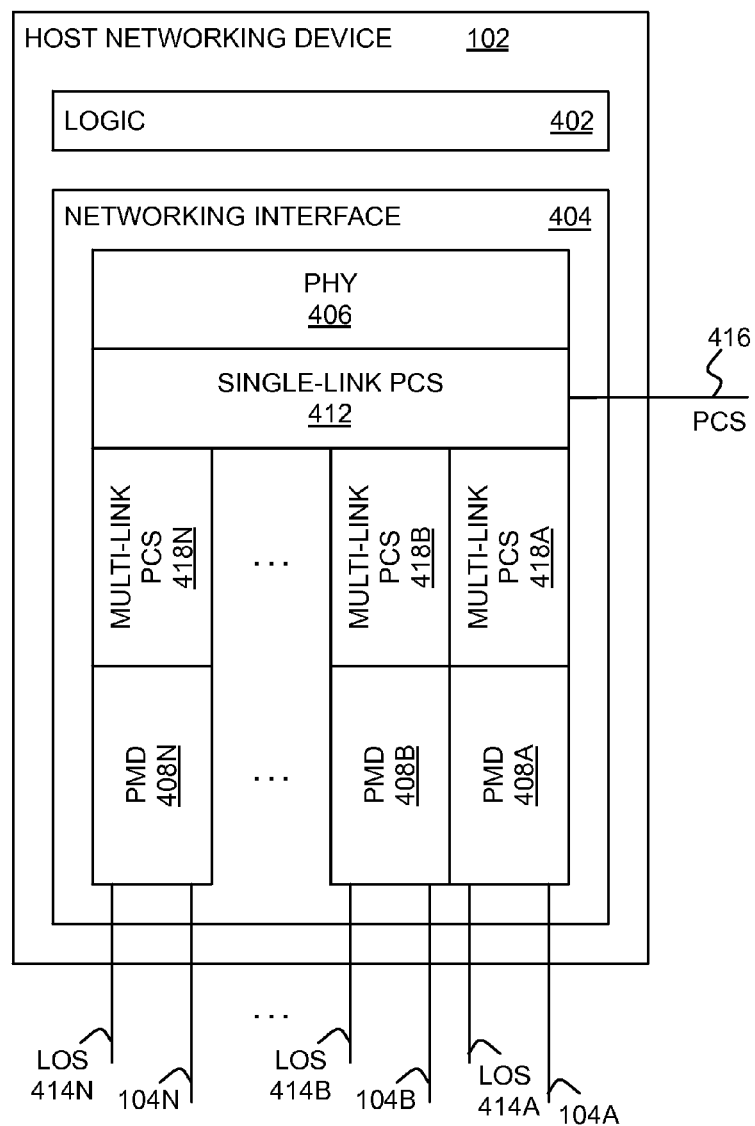
FIG. 4 is a diagram of an example host networking device.

FIG. 4 shows an example implementation of the host networking device 102. The host networking device 102 includes logic 402 and a networking interface 404. The logic 402 is implemented at least in hardware, and performs the method 300 that has been described. The logic 402 may be completely hardware, such as an application-specific integrated circuit (ASIC), a field-programmable gate array (FPGA), and so on. The logic 402 may be computer-executable code stored on a computer-readable data storage medium and executable by a processor, in a software-and-hardware implementation of the logic 402.

The networking interface 404 includes a number of sublayers, such as the PHY 406, a single-link PCS 412, the PMDs 408, and multiple-link PCSs 418. The PHY 406 provides the physical layer device of the networking interface 404. The PMDs 408 include multiple PMDs 408A, 408B, . . . , 408N, implement or connect the network communication lanes 104, and provide corresponding LOS signals 414A, 414B, . . . , 414N, which may each be a single N-bit LOS signal, and which correspond to the network communication lanes 104. The multiple-link PCSs 418 include multiple PCSs 418A, 418B, . . . , 418N, corresponding to the PMDs 408 and to the network communication lanes 104. The single-link PCS 412 provides the PCS signal 416 corresponding to whether a single link has been established over all the network communication lanes 104.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

I claim:

1. A method for automatically configuring a networking interface of a host networking device, the method comprising:
   configuring the networking interface, by the host networking device without user interaction, to operate in a single-link mode in which a plurality of network communication lanes of the networking interface cooperatively provide a single communication link;
   after configuring the networking interface to operate in the single-link mode, determining, by the host networking device without user interaction, whether a signal is present on each network communication lane;
   in response to determining that the signal is not present on every network communication lane, configuring the networking interface, by the host networking device without user interaction, to operate in a multiple-link mode in which each network communication lane provides a separate and different communication link, and operating the networking interface in the multiple-link mode;
   in response to determining that the signal is present on every network communication lane,
      determining, by the host networking device without user interaction, whether the single communication link has been established with another networking device over all the network communication lanes;
      in response to determining that the single communication link has been established over all the network communication lanes, operating the networking interface in the single-link mode; and
      in response to determining that the single communication link has not been established over all the network communication lanes, configuring the networking interface, by the host networking device without user interaction, to operate in the multiple-link mode, and operating the networking interface in the multiple-link mode,
   wherein the networking interface is configured between the single-link mode and the multiple-link mode just based on whether the signal is present on every network communication lane, and based on whether the single communication link has been established with another networking device.

2. The method of claim 1, wherein the single communication link cooperatively provided by the network communication lanes in the single-link mode is faster than the separate and different communication link provided by each network communication lane in the multiple-link mode.

3. The method of claim 1, wherein the network communication lanes are n in number, and each network communication lane provides a same bandwidth X,
   wherein in the multiple-link mode, the networking interface communicates over one or more of the separate and different communication links that are n in number at a bandwidth X for each separate and different communication link,
   and wherein in the single-link mode, the networking interface communicates over the single communication link that is one in number at a bandwidth of n times X.

4. The method of claim 3, wherein X is ten gigabits per second (gbps) and n is one of four and ten.

5. The method of claim 1, further comprising, after configuring the networking interface to operate in the single-link mode,
   waiting, by the host networking device, until the host networking device has determined that the signal is present on any network communication lane before proceeding to determine whether the signal is present on each network communication lane.

6. The method of claim 5, further comprising, after configuring the networking interface to operate in the single-link mode,
   waiting, by the host networking device, until the host networking has determined that a networking cable has been connected to the networking interface before proceeding to wait until the host networking device has determined that the signal is present on any network communication lane.

7. The method of claim 1, further comprising, after operating the networking interface in the multiple-link mode or in the single-link mode,
   proceeding back to configuring the networking interface to operate in the single-link mode responsive to one or more of: reboot of the host networking device, user initiation of networking interface reconfiguration, and determination that a networking cable has been disconnected from the networking interface.

8. The method of claim 1, wherein determining whether the signal is present on each network communication lane comprises inspecting a physical medium dependent sublayer (PMD) loss-of-signal (LOS) signal provided by a physical devices sublayer (PHY) of the networking interface for each network communication lane.

9. The method of claim 1, wherein determining whether the single communication link has been established over all the network communication lanes comprises inspecting a physical coding sublayer (PCS) link-up signal provided by a physical devices sublayer (PHY) of the networking interface for the single communication link.

10. The method of claim 1, wherein the networking interface is an Ethernet networking interface.

11. A host networking device comprising:
a network interface having a plurality of network communication lanes; and
logic implemented at least by hardware to:
automatically configure the network interface without user interaction between operation in a single-link mode in which the network communication lanes cooperatively provide a single communication link and a multiple-link mode in which each network communication lane provides a separate and different communication link;
configure the networking interface to operate in the single-link mode;
after configuring the networking interface to operate in the single-link mode, determine whether a signal is present on each network communication lane;
in response to determining that the signal is not present on any network communication lane, configure the networking interface to operate in the multiple-link mode, and operate the networking interface in the multiple-link mode;
in response to determining that the signal is present on every network communication lane,
determine whether the single communication link has been established with another networking device over all the network communication lanes;
in response to determining that the single communication link has been established over all the network communication lanes, operate the networking interface in the single-link mode; and
in response to determining that the single communication link has not been established over all the network communication lanes, configure the networking interface to operate in the multiple-link mode, and operate the networking interface in the multiple-link mode,
wherein the networking interface is configured between the single-link mode and the multiple-link mode just based on whether the signal is present on every network communication lane, and based on whether the single communication link has been established with another networking device.

12. The host networking device of claim 11, wherein the network communication lanes are n in number, and each network communication lane provides a same bandwidth X,
wherein in the multiple-link mode, the networking interface communicates over one or more of the separate and different communication links that are n in number at a bandwidth X for each separate and different communication link,
and wherein in the single-link mode, the networking interface communicates over the single communication link that is one in number at a bandwidth of n times X.

13. The host networking device of claim 11, wherein the logic is to, after configuring the networking interface to operate in the single-link mode,
wait until the logic has determined that the signal is present on any network communication lane before proceeding to determine whether the signal is present on each network communication lane.

14. The host networking device of claim 13, wherein the logic is to, after configuring the networking interface to operate in the single-link mode,
wait until the logic has determined that a networking cable has been connected to the networking interface before proceeding to wait until the host networking device has determined that the signal is present on any network communication lane.

15. The host networking device of claim 11, wherein the logic is to, after operating the networking interface in the multiple-link mode or in the single-link mode,
proceed back to configuring the networking interface to operate in the single-link mode responsive to one or more of: reboot of the host networking device, user initiation of networking interface reconfiguration, and determination that a networking cable has been disconnected from the networking interface.

16. The host networking device of claim 11, wherein the logic is to determine whether the signal is present on each network communication lane by inspecting a physical medium dependent sublayer (PMD) loss-of-signal (LOS) signal provided by a physical devices sublayer (PHY) of the networking interface for each network communication lane.

17. The host networking device of claim 11, wherein the logic is to determine whether the single communication link has been established over all the network communication lanes by inspecting a physical coding sublayer (PCS) link-up signal provided by a physical devices sublayer (PHY) of the networking interface for the single communication link.

18. The host networking device of claim 11, wherein the networking interface is an Ethernet networking interface.

19. A computer program product comprising:
a computer-readable storage medium having computer-readable code embodied therein, executable by a host computing device having a networking interface, and comprising:
first computer-readable code to configure the networking interface without user interaction to operate in a single-link mode in which a plurality of network communication lanes of the networking interface cooperatively provide a single communication link;
second computer-readable code to, after configuring the networking interface to operate in the single-link mode, determine without user interaction whether a signal is present on each network communication lane;
third computer-readable code to, in response to determining that the signal is not present on any network communication lane, configure the networking interface without user interaction to operate in a multiple-link mode in which each network communication lane provides a separate and different communication link, and to operate the networking interface in the multiple-link mode;
fourth computer-readable code to, in response to determining that the signal is present on every network communication lane, determine without user interaction whether the single communication link has been established with another networking device over all the network communication lanes;
fifth computer-readable code to, in response to determining that the single communication link has been established over all the network communication lanes, operate the networking interface in the single-link mode; and sixth computer-readable code to, in response to determining that the single communication link has not been established over all the network communication lanes, configure the networking interface without user interaction, to operate in the multiple-link mode, and to operate the networking interface in the multiple-link mode, wherein the networking interface is configured between the single-link mode and the multiple-link mode just based on whether the signal is present on every network communication lane, and based on whether the single communication link has been established with another networking device.

\* \* \* \* \*